(12) United States Patent
Yuan

(10) Patent No.: US 12,111,888 B2
(45) Date of Patent: Oct. 8, 2024

(54) LOCALIZATION OF INDIVIDUAL PLANTS BASED ON HIGH-ELEVATION IMAGERY

(71) Applicant: DEERE & COMPANY, Moline, IL (US)

(72) Inventor: Zhiqiang Yuan, San Jose, CA (US)

(73) Assignee: DEERE & COMPANY, Moline, IL (US)

(*) Notice: Subject to any disclaimer, the term of this patent is extended or adjusted under 35 U.S.C. 154(b) by 345 days.

(21) Appl. No.: 17/344,328

(22) Filed: Jun. 10, 2021

(65) Prior Publication Data

US 2022/0398415 A1 Dec. 15, 2022

(51) Int. Cl.
*G06F 18/24* (2023.01)
*A01D 46/30* (2006.01)
(Continued)

(52) U.S. Cl.
CPC ............ *G06F 18/24* (2023.01); *B64C 39/024* (2013.01); *G06T 7/33* (2017.01); *G06V 10/751* (2022.01); *G06V 20/182* (2022.01); *G06V 20/188* (2022.01); *A01C 21/007* (2013.01); *A01D 46/30* (2013.01); *A01M 21/00* (2013.01);
(Continued)

(58) Field of Classification Search
CPC . G06F 18/24; G06T 7/33; G06T 2207/10032; G06T 2207/30184; G06T 2207/30188; G06V 10/751; G06V 20/188; G06V 20/182; B64C 39/024; A01C 21/007; A01D 46/30; A01M 21/00
See application file for complete search history.

(56) References Cited

U.S. PATENT DOCUMENTS 10,402,942 B2 9/2019 Taipale et al.
10,614,305 B2 4/2020 Muehfeld et al.
(Continued)

OTHER PUBLICATIONS

Christiansen et al., "Designing and Testing a UAV Mapping System for Agricultural Field Surveying" Sensors 2017, 17, 2703; doi:10.3390/s17122703. 19 pages.
(Continued)

*Primary Examiner* — Shefali D Goradia
*Assistant Examiner* — D J Dhooge
(74) *Attorney, Agent, or Firm* — Hanley, Flight & Zimmerman, LLC

(57) ABSTRACT

Implementations are described herein for localizing individual plants by aligning high-elevation images using invariant anchor points while disregarding variant feature points, such as deformable plants. High-elevation images that capture the plurality of plants at a resolution at which wind-triggered deformation of individual plants is perceptible between the high-elevation images may be obtained. First regions of the high-elevation images that depict the plurality of plants may be classified as variant features that are unusable as invariant anchor points. Second regions of the high-elevation images that are disjoint from the first set of regions may be classified as invariant anchor points. The high-elevation images may be aligned based on invariant anchor point(s) that are common among at least some of the high-elevation images. Based on the aligned high-elevation images, individual plant(s) may be localized within one of the high-elevation images for performance of one or more agricultural tasks.

20 Claims, 6 Drawing Sheets

(51) Int. Cl.
| | |
|---|---|
| *A01M 21/00* | (2006.01) |
| *B64C 39/02* | (2023.01) |
| *G06T 7/33* | (2017.01) |
| *G06V 10/75* | (2022.01) |
| *G06V 20/10* | (2022.01) |
| *A01C 21/00* | (2006.01) |
| *B64U 101/30* | (2023.01) |

(52) U.S. Cl.
CPC *B64U 2101/30* (2023.01); *G06T 2207/10032* (2013.01); *G06T 2207/30184* (2013.01); *G06T 2207/30188* (2013.01)

(56) References Cited

U.S. PATENT DOCUMENTS

| | | | |
|---|---|---|---|
| 10,716,292 B1* | 7/2020 | Fox | A01G 7/045 |
| 2017/0358106 A1* | 12/2017 | Yoshimura | G06T 7/0012 |
| 2019/0034725 A1* | 1/2019 | Tyburski | G06T 1/20 |
| 2019/0205610 A1* | 7/2019 | Muehlfeld | G06T 5/50 |
| 2020/0294620 A1* | 9/2020 | Bauer | G06V 20/188 |
| 2020/0401883 A1* | 12/2020 | Yang | G05D 1/0033 |

OTHER PUBLICATIONS

Demange "Next-generation positioning for direct georeferencing of multispectral imagery from an Unmanned Aerial System (UAS)" University of Tasmania, Australia. dated Jun. 7, 2019. 85 pages.

Grayson et al., "GPS Precise Point Positioning For UAV Photogrammetry" The Photogrammetric Record (2018). doi:10.1111/phor.12259. 21 pages.

Laliberte et al., "Acquisition, Orthorectification, and Object-based Classification of Unmanned Aerial Vehicle (UAV) Imagery for Rangeland Monitoring" Photogrammetric Engineering & Remote Sensing. vol. 76, No. 6, Jun. 2010. pp. 661-672.

Hobbs et al., "Large-Scale Counting and Localization of Pineapple Inflorescence Through Deep Density-Estimation" Original Research. doi:10.3389/fpls.2020.599705 dated Jan. 28, 2021. 14 pages.

Dev Nakarmi "Automated inter-plant spacing sensing of corn plant seedlings and quantification of layering hen behaviors using 3D computer vision" (2013). Graduate Theses and Dissertations. 13313 https://lib.dr.ia.state.edu/etd/13313. 140 pages.

Kraemer et al., "From Plants to Landmarks: Time-invariant Plant Localization that uses Deep Pose Regression in Agricultural Fields" arXiv:1709.04751v1 [cs.RO] dated Sep. 14, 2017. 6 pages.

Ambrozowicz "Weed Detection Using Machine Learning—A game changer in agriculture" https://picterra.ch/blog/weed-detection-using-machine-learning/ dated Mar. 2, 2020. 10 pages.

Molina "Unmanned aerial systems for photogrammetry and remote sensing: A review" ISPRS Journal of Photogrammetry and Remote Sensing 92 (2014) pp. 79-97.

Rizk et al., "Real-Time SLAM Based on Image Stitching for Autonomous Navigation of UAVs in GNSS-Denied Regions" 2020 IEEE International Conference on Artificial Intelligence Circuits and Systems (AICAS) 4 pages.

Adel et al., "Image Stitching based on Feature Extraction Techniques: A Survey" International Journal of Computer Applications (0975-8887) vol. 99—No. 6, dated Aug. 2014. 8 pages.

\* cited by examiner

LOCALIZATION OF INDIVIDUAL PLANTS BASED ON HIGH-ELEVATION IMAGERY

BACKGROUND

With large scale agriculture, crops typically are observed, measured, and/or interacted with in a relatively coarse manner. For example, data gathered from sparse sampling may be used to extrapolate crop yields, disease diagnoses, and/or pest presence/population for entire plots of plants. This can lead to less-than-ideal agricultural practices such as over/under application of fertilizer or other chemicals, over/under remediation of weeds and/or pests, and so forth. These agricultural practices may yield less than optical crop yields because healthy plants may be destroyed or damaged, unhealthy plants may be inadequately remediated, etc.

"Precision agriculture" refers to techniques for observing, measuring, and/or interacting with (e.g., harvesting, applying chemicals, pruning, etc.) crops in a highly targeted and granular manner, including at the level of individual, localized plants. Precision agriculture may improve crop yields and increase agricultural efficiency and/or land use overall. As agricultural robots become increasingly available and capable, precision agriculture has become more feasible, technologically and economically, with localization of individual plants being a key feature. However, existing plant localization techniques suffer from various shortcomings, such as being computationally expensive, error-prone, and/or too time-consuming.

SUMMARY

Implementations are described herein for localizing individual plants by aligning high-elevation images using invariant anchor points instead of variant feature points, such as deformable plants themselves, which tend to be disproportionately prevalent in agricultural areas. In some implementations, rather than blending or fusing a global image together from multiple high-elevation images—which can be computationally expensive—multiple high-elevation images may be aligned such that invariant anchor points across different high-elevation images can be localized relative to each other. With the invariant anchor points localized, individual high-elevation images can be independently processed to localize individual plants relative to the invariant anchor points.

In some implementations, a method for localizing one or more individual plants of a plurality of plants may be implemented using one or more processors and may include: obtaining high-elevation images that capture the plurality of plants at a resolution at which wind-triggered deformation of individual plants is perceptible between the high-elevation images; classifying a first set of regions of the high-elevation images that depict the plurality of plants as variant features that are unusable as invariant anchor points; classifying a second set of regions of the high-elevation images that are disjoint from the first set of regions as invariant anchor points; aligning the high-elevation images based on one or more of the invariant anchor points that are common among at least some of the high-elevation images; and based on the aligned high-elevation images, localizing one or more individual plants of the plurality of plants within one of the high-elevation images for performance of one or more agricultural tasks.

In various implementations, the localizing may include assigning position coordinates to the one or more individual plants based on position coordinates generated by an airborne vehicle that acquired the high-elevation images. In various implementations, the localizing may include mapping the one or more individual plants to one or more rows of a plurality of rows in which the plurality of plants are arranged. In various implementations, the method may include processing the aligned high-elevation images to generate a map of the plurality of rows relative to the invariant anchor points.

In various implementations, each region of the first and second sets of regions may be pixel-wise classified. In various implementations, the method may include deploying one or more agricultural robots to the one or more localized individual plants to perform one or more of the agricultural tasks. In various implementations, the high-elevation images are acquired by an unmanned aerial vehicle (UAV).

In various implementations, classifying the first set of regions may include processing the high-elevation images based on one or more machine learning models that are trained to recognize one or more plant types. In various implementations, classifying the second set of regions may include detecting one or more lodged plants among the plurality of plants. In various implementations, classifying the second set of regions may include detecting agricultural equipment in spatial proximity with the plurality of plants. In various implementations, classifying the second set of regions may include detecting one or more water features or roads in spatial proximity with the plurality of plants.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
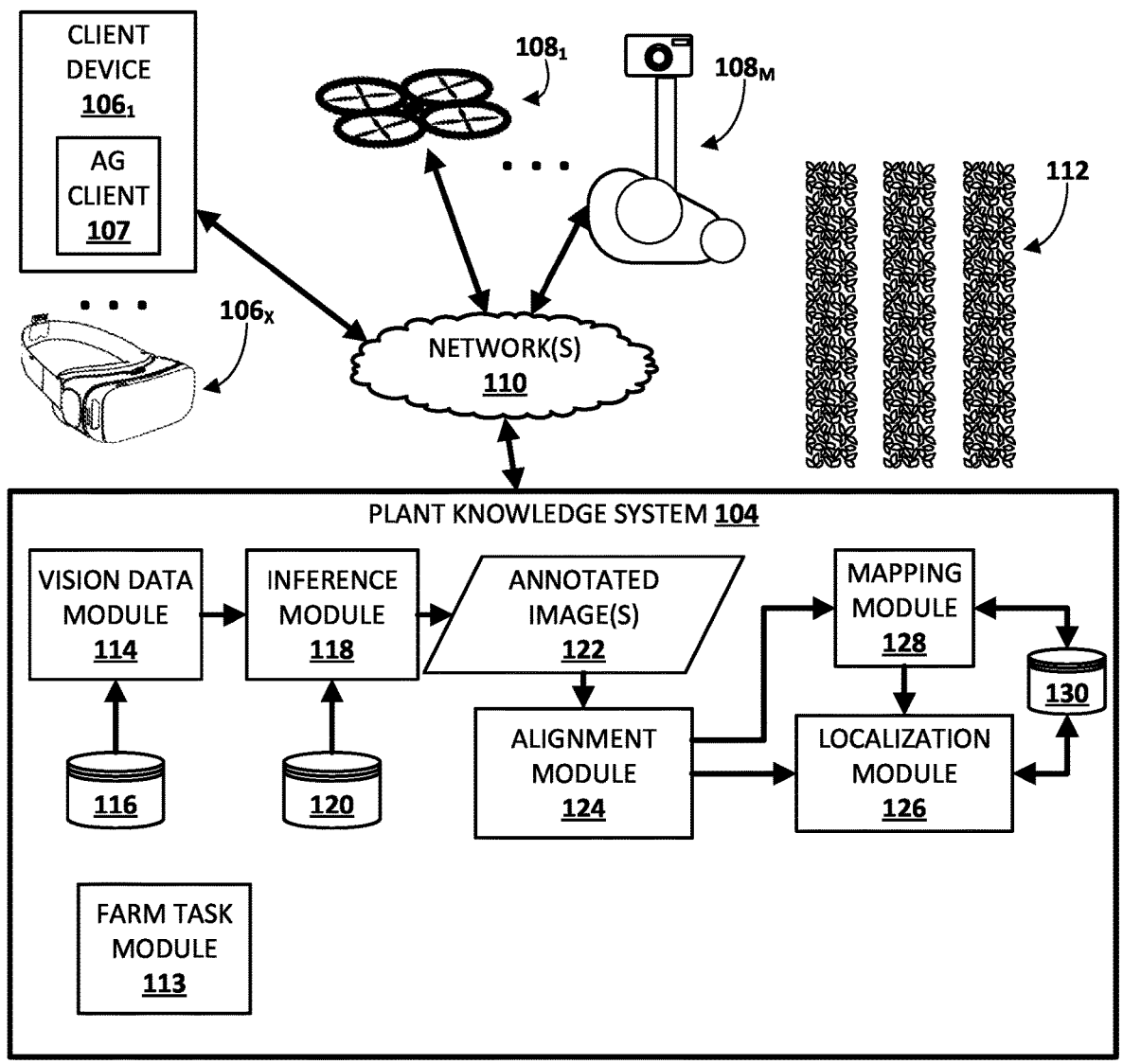
FIG. 1 schematically depicts an example environment in which selected aspects of the present disclosure may be employed in accordance with various implementations.

The ability to localize individual plants may be useful for a variety of purposes. For precision agriculture, it may be beneficial to localize individual plants so that agricultural personnel and/or robots are able to locate and perform fine-grained agricultural tasks on individual plants. As another example, localizing individual plants may allow for tracking of individual plants' growth (or lack thereof), disease progression, fruit development (or lack thereof), and so forth. Tracking these metrics enables other applications, such as distinguishing portions of crop fields that are not meeting growth expectations (e.g., due to disease, insufficient or too much irrigation, insufficient or too much fertilizer, etc.) from other portions that are meeting growth expectations.

While individual plant localization is possible using ground-based equipment such as robots, many crop fields and/or farms are exceedingly large, making land-based localization cumbersome at best and impractical at worst. Localization based on high-elevation imagery captured by airborne devices, such as a balloon or an unmanned aerial vehicle (UAV), may be performed more efficiently than land-based localization. However, air-based localization presents its own challenges.

In many cases, multiple high-elevation images captured by an airborne device such as a UAV are combined into a global image using a stitching or "mosaicking" for purposes of georeferencing individual plants based on GPS coordinates of the airborne device. However, given the typically high resolution of this imagery, stitching techniques that require calibration, registration, and/or blending/fusing may be too computationally expensive for real-time or near-real-time localization. While feature-based stitching techniques are faster than direct stitching techniques (e.g., Fourier analysis), they also present unique challenges in the agricultural context where highly-variant and homogenous-appearing crops tend to dominate other visual features. For instance, deformable plants such as corn, soybean, wheat, oats, etc., may tend to sway and/or otherwise deform with the wind, introducing distortion into the stitching process.

Implementations are described herein for localizing individual plants based on high-elevation imagery. More particularly, but not exclusively, implementations are described herein for localizing individual plants by aligning high-elevation images using invariant anchor points instead of variant feature points, such as deformable plants themselves, which tend to be disproportionately prevalent in agricultural areas. In some implementations, rather than blending or fusing a global image together from multiple high-elevation images—which as noted previously can be computationally expensive—multiple high-elevation images may be aligned such that invariant anchor points across different high-elevation images can be localized relative to each other. Aligning two or more high-elevation images may include, for instance, translating one or both images relative to the other, rotating one or both images relative to the other, morphing one or both images relative to the other, etc. With the invariant anchor points localized, individual high-elevation images can be independently processed to localize individual plants relative to the invariant anchor points.

In various implementations, high-elevation images may be acquired, e.g., by an airborne vehicle such as a UAV, an airplane, or a balloon. These high-elevation images may be acquired at an elevation at which individual plants are perceptible, but also at which deformation of the individual plants is perceptible between the high-elevation images. For example, the images may be acquired at an elevation at which swaying of individual plants caused by the wind would introduce distortion into a traditional image stitching process. This elevation may vary depending on the types and/or sizes of the crops, and may be between ten meters and one hundred meters in some cases, or higher in others.

In some implementations, the high elevation images may be processed to classify regions (e.g., clusters of pixels, bounded areas) depicting deformable plants as variant features. These variant features may then be disregarded when multiple high-elevation images are aligned with each for plant localization purposes. Instead, other regions of the high-elevation images that are disjoint from the regions classified as variant features may be classified as invariant anchor points. These invariant anchor points, and in particular, invariant anchor points that are common across multiple high-elevation images, may be used to align the high-elevation images.

Based on the aligned high-elevation images—which need not be blended or fused into a global image—individual plants may be localized for subsequent (e.g., downstream) performance of agricultural tasks on those individual plants. These agricultural tasks may be performed automatically by agricultural robots who are deployed to the localized plants, or they may be performed by agricultural personnel who are provided with directions, a map, or other data they can use to find their way to the localized plants.

Invariant anchor points may include any visual feature that is not perceptively deformed (e.g., does not sway in the wind) from one high-elevation image to the next. Invariant anchor points may be man-made, natural, or any combination thereof. Man-made invariant anchor points may include, for instance, stationary or idle farm equipment, water features such as ponds, roads, trails, irrigation equipment such as sprinklers, valves, or pipes, flags, electrical units, fences, weather equipment, buildings, and so forth. Natural invariant anchor points may include, for instance, natural creeks or ponds, large and/or non-deformable trees or bushes, rocks, and so forth. Other invariant anchor points may include, for instance, holes in rows of plants where individual plants are missing or lodged (and hence, cannot sway in the breeze).

In contrast to invariant anchor points, variant features may include plants that are susceptible to deformation, e.g., due to wind, that is perceptible across multiple high-elevation images. As noted previously, this deformation may introduce noise into conventional image stitching processes. Thus, in various implementations described herein, these variant features may be disregarded for purposes of aligning multiple high-elevation images with each other based on common invariant anchor points. Moreover, various aspects of conventional image stitching such as calibration and blending and/or fusing that are negatively influenced by variant features are not necessary for localization of individual plants using techniques described herein. Rather than being localized within a single global stitched/mosaicked image, with disclosed techniques, individual plants may be localized within individual high-elevation images, independently from other high-elevation images.

As noted previously, the non-fused and aligned high-elevation images can be analyzed to localize individual plants. This localization may be performed in various ways. In some implementations, the aligned plurality of high-elevation images may be processed to generate a map of a plurality of rows of plants relative to a plurality of invariant anchor points. Individual plants may then be mapped to respective rows of the plurality of rows. Thus, for instance, an individual plant can be localized as being "three rows west and two plots north of invariant anchor point 1001." An invariant anchor point itself may be localized as being "ten rows west and five plants south from field corner C."

In some implementations, the localization may include assigning position coordinates, such as Global Positioning System (GPS) coordinates, to individual plants. For example, if GPS coordinates of locations (especially three or more locations) such as invariant anchor points and/or field corners can be determined, then those GPS coordinates can be used to interpolate GPS coordinates of individual plants relative to those locations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more plots of multiple rows of crops, one or more gardens, one or more greenhouses, or any other areas in which there may be an interest or desire to automatically detect, classify, and/or segment particular types of plants. Plants that are captured in digital imagery and analyzed using techniques described herein may take any form depending on the circumstances. Some plants may be considered desirable, and may include, for instance, strawberry plants, raspberries, sugar beets, soybeans, beans, corn, cabbage, lettuce, spinach, wheat, berries, etc. Other plants may be considered undesirable (e.g., weeds), and may include, for instance, dandelions, waterhemp, giant ragweed, marestail (also commonly known as horseweed), common lambsquarters, common groundsel, field pansy, mayweed or dog fennel, pineapple-weed or chamomile, several pigweeds, and white campion, yellow woodsorrel, yellow nutsedge, etc.

An individual (which in the current context may also be referred to as a "user") may operate one or more client devices $106_1$-$x$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_x$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction, plant-part-of-interest inventory, crop disease diagnosis, etc. For example, a first client device $106_1$ operates agricultural ("AG") client 107 (e.g., which may be standalone or part of another application, such as part of a web browser). Another client device $106_x$ may take the form of a HMD that is configured to render 2D and/or 3D data to a wearer as part of a VR immersive computing experience. For example, the wearer of client device $106_x$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a farm task module 113 may generate a report, a map, instructions, and/or any other data that may be presented to an operator of a client device 106 using a graphical user interface, audibly, etc. These data may inform the agricultural personnel where targeted individual plants—e.g., weeds, crops ready to be harvested, diseased crops, underperforming or over-performing crops, pest-infested crops, etc.—are located (or "localized"), what action(s) should be taken on those plants, a timeframe in which those action(s) should be taken, etc.

In some implementations, one or more robots $108_{1-M}$ may be deployed to perform various agricultural tasks. An individual robot $108_{1-M}$ may take various forms, such as an unmanned aerial vehicle (UAV) $108_1$, a robot (not depicted) that is propelled along a wire, track, rail or other similar component that passes over and/or between crops, a wheeled robot $108_M$, or any other form of robot capable of being propelled or propelling itself past crops of interest. In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In various implementations, plant knowledge system 104 may be implemented across one or more computing systems that may or may not be referred to as the "cloud." Plant knowledge system 104 may receive vision data generated by robots $108_{1-M}$ and/or any other sources of digital imagery capturing agricultural area 112, and process it using various image processing techniques to perform tasks such as plant localization, detection, classification, and/or segmentation. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel and/or one or more robots $108_{1-M}$. Plant knowledge system 104 may also include a machine learning model database 120 that includes one or more machine learning models that may be trained, for instance, to detect plants at various levels of granularity. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots $108_{1-M}$ (particularly relevant to the present disclosure is high-elevation imagery captured by UAV $108_1$) and/or imagery captured by agricultural personnel. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to process imagery data received from vision data module 114 as input based on various machine learning models stored in machine learning model database 120 to generate output. This output may include classifications and/or annotations, at various levels of granularity, of plants and/or other objects that are detected and/or segmented in imagery data received from vision data module 114. To this end, machine learning models stored in database 120 may be trained to detect, classify, and/or segment plants/plant parts within imagery data, such as high-elevation imagery capturing agricultural area(s) 112 that is acquired by UAV $108_1$.

Various types of machine learning models may be trained to detect, classify, annotate, and/or segment particular plants and/or other plant parts of interest in imagery data. In some implementations, a convolutional neural network ("CNN") may be trained (e.g., based on human-annotated ground truth images, based on synthetic training data, etc.) to generate output indicative of one or more types and/or categories of plants detected in digital imagery. In FIG. 1, for instance, inference module 118 generates annotated image(s) 122 that include pixel-wise or bounding-shape annotations identifying one or more detected plants. These annotations may be used, for instance, to segment the digital image into regions depicting deformable plants and/or regions that do not depict deformable plants. The former regions may be classified as variant features that have limited or no utility for image alignment. The latter regions may be classified as invariant anchor points that are usable for image alignment.

An alignment module 124 may be configured to align high-elevation images captured by UAV $108_1$ based on one or more invariant anchor points that are common among at least some of the high-elevation images. For example, alignment module 124 may identify, from annotated images 122, annotated (e.g., pixel-wise annotated, bounding shape annotated) invariant anchor points such as stationary or idle farm equipment, lodged plants, holes in rows of plants, irrigation equipment such as sprinklers or cisterns, wells, water features, large stones or arrangements of smaller stones, roads, buildings, flags, indicia printed on mulch, etc. Alignment module 124 may also match one or more invariant anchor features identified in one high-elevation image with the same one or more invariant anchor features in another high-elevation image.

Alignment module 124 may perform this matching of invariant anchor points using various techniques. For example, alignment module 124 may compare distances between embeddings generated from invariant anchor points in embedding space. Additionally or alternatively, alignment module 124 may apply other techniques, such as appearance-based methods such as edge matching, divide-and-conquer, gradient matching, greyscale matching, histograms, and/or feature-based methods such as interpretation trees, pose clustering, geometric hashing, scale-invariant feature transform ("SIFT"), speeded up robust features ("SURF"), trained machine learning models (e.g., convolutional neural networks), and so forth.

Based on the aligned high-elevation images generated by alignment module 124, localization module 126 may be configured to localize one or more individual plants of a plurality of plants (e.g., a crop field) within any individual high-elevation image of the aligned high-elevation images. For example, localization module 126 may store relative and/or absolute position coordinates of the plant in a mapping/localization database 130. Relative position coordinates may include, for instance, directions to the plant from one or more reference points, such as one or more invariant anchor points, or inertial measurement unit (IMU) coordinates. Absolute position coordinates may include, for instance, GPS coordinates of the localized plant.

The localized plant data (e.g., absolute or relative position coordinates) may be provided to farm task module 113 so that farm task module 113 can cause one or more agricultural tasks to be performed on the localized plant. These agricultural tasks may vary, and may include, but are not limited to, picking the plant, harvesting fruit from the plant, treating the plant with a chemical and/or fertilizer, trimming the plant, destroying the plant, etc. These agricultural tasks may be performed by agricultural personnel (e.g., by providing them with a map including directions to the localized plant) and/or by agricultural robots.

In some implementations, a mapping module 128 may be configured to generate maps of an agricultural area, which in some cases may be based on and/or incorporate localization data generated by localization module 126. For example, mapping module 128 may map one or more individual plants to one or more rows of a plurality of rows in which a plurality of plants are arranged. In some implementations, mapping module 128 may process the aligned high-elevation images, e.g., generated by alignment module 124, to generate a map of the plurality of rows relative to the invariant anchor points. This map may be stored, for instance, in mapping/localization database 130. In various implementations, farm task module 113 may use mapping data and localization data stored in database 130 to deploy humans and/or robots to perform agricultural tasks.

Figure 3:
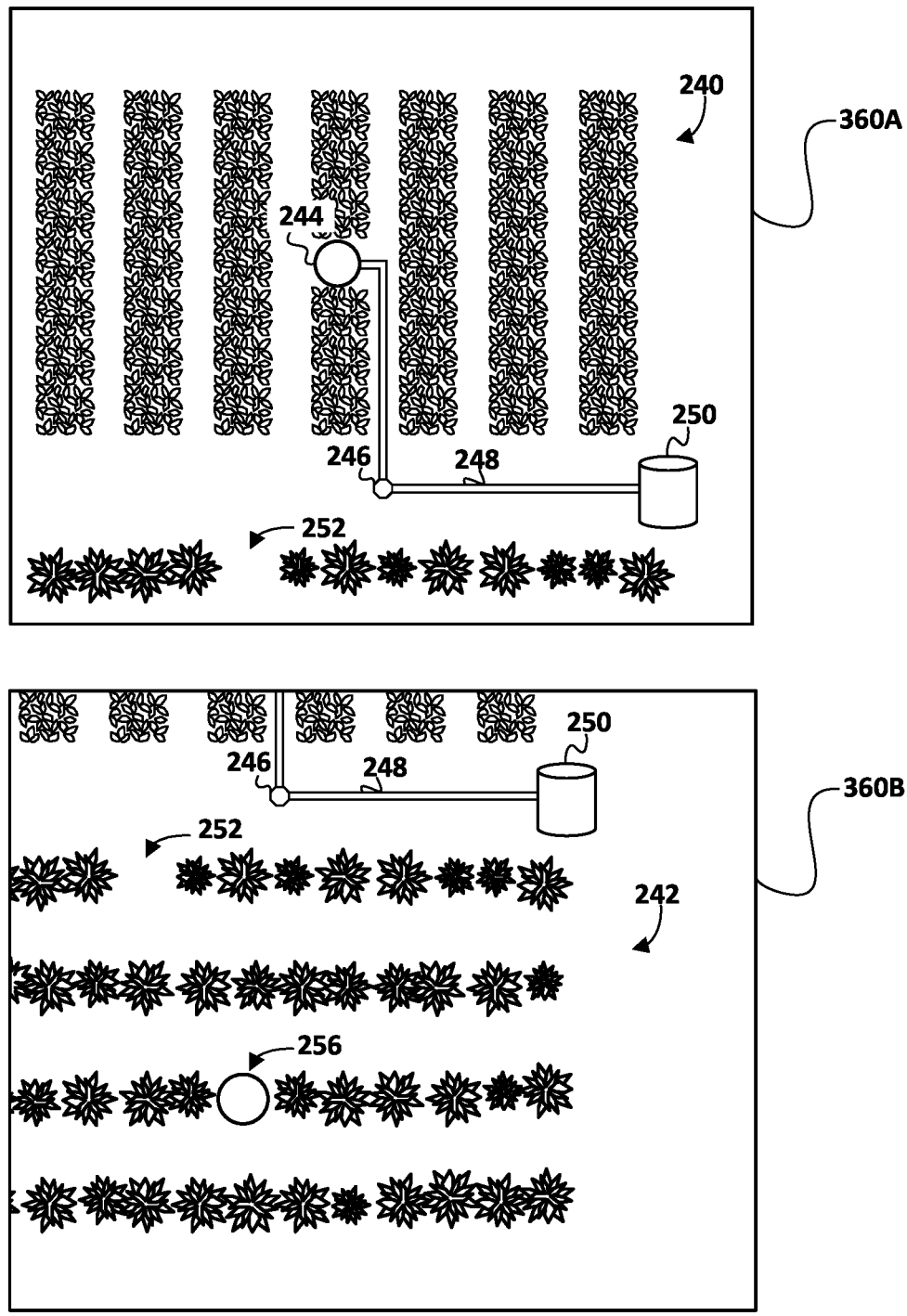

FIG. 3 depicts an agricultural area 212 that includes two plots, a first plot 240 up top and a second plot 242 at bottom. First plot 240 includes a plurality of vertical rows of crops of a first type. Second plot 242 includes a plurality of horizontal rows of crops of a second type. As mentioned previously, the crops depicted in plots 240, 242 may be deformable to some extent, e.g., in response to wind. This deformation would introduce distortions into a process of stitching a plurality of high-elevation images of agricultural area 212 captured by an airborne vehicle such as a UAV (108$i$ in FIG. 1). Accordingly, in various implementations, inference module 118 may analyze high-elevation images of agricultural area 112, e.g., using one or more machine learning models such as one or more CNNs, to classify a first set of regions of high-elevation images that depict these plants (e.g., on a pixel-wise basis, using bounding shapes, etc.) as variant features that are unusable as invariant anchor points.

Figure 2:
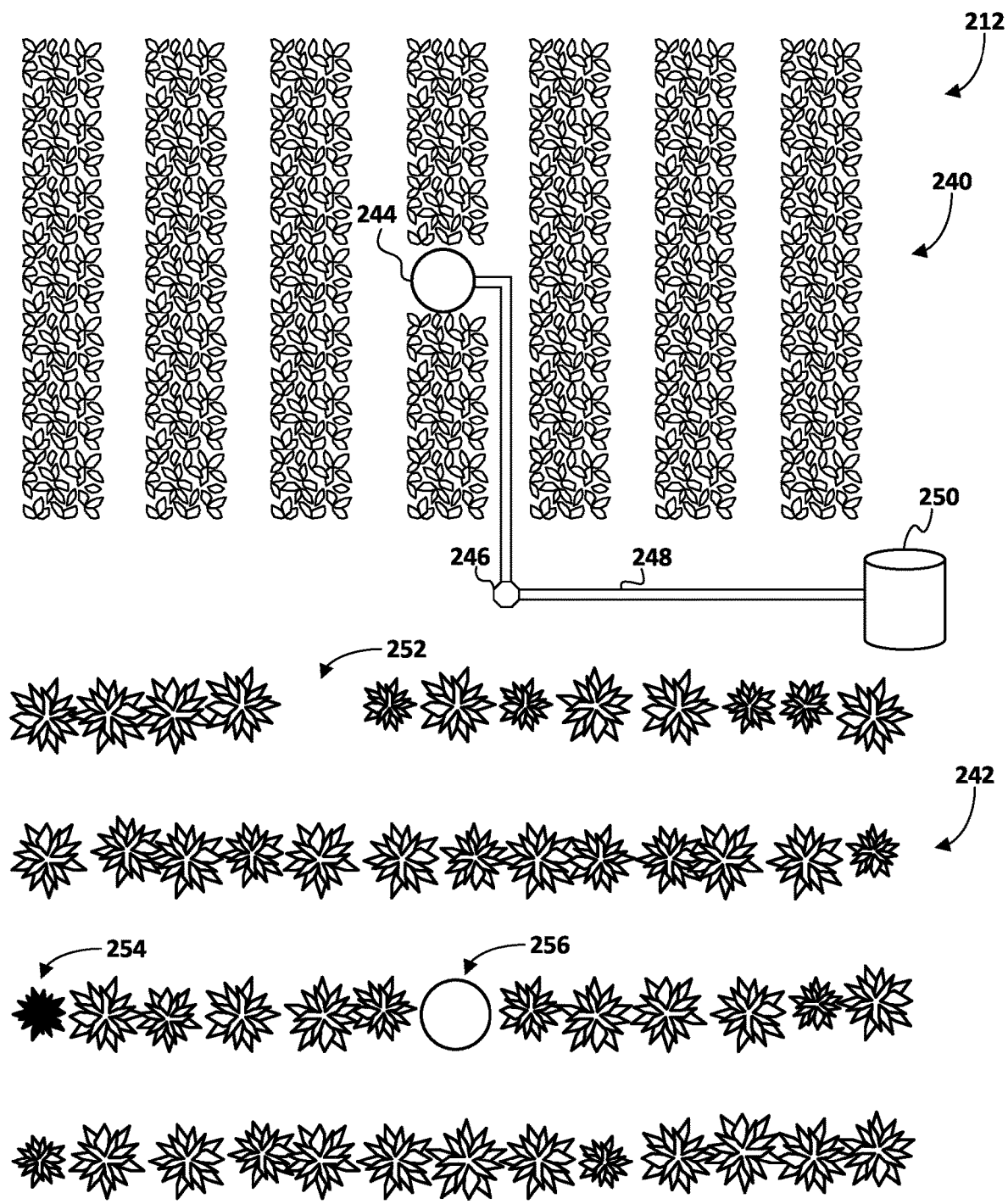
FIG. 2, FIG. 3, and FIG. 4 schematically demonstrate an example of how techniques described herein may be employed to align high-elevation images of an agricultural area for purposes of localization.

Inference module 118 may classify a second set of regions of the high-elevation images that are disjoint from the first set of regions as invariant anchor points. Various candidate invariant anchor points are depicted in FIG. 2. A sprinkler 244 is disposed near a center of first plot 240. Sprinkler 244 is connected to a cistern 250 via piping 248 that passes through a piping junction 246. In second plot 242, an empty spot 252 is left cropless between crops of the top row of second plot 242. Another dead and/or lodged plant 254 (shaded in black) is located in the third row down of second plot 242 at far left. Also disposed in second plot 242 is a piece of farm equipment 256, such as a sprinkler, building, flag, etc. As these various features are relatively non-deformable (e.g., at least across two or more high-elevation images acquired during a short time interval, such as a UAV's flight), they may be classified as invariant anchor points.

In some implementations, all regions that are not classified as variant features may be classified as anchor points. Additionally or alternatively, in some implementations, object recognition techniques such as CNNs may be applied to classify particular objects as types that are usable as invariant anchor points. In the latter case, agricultural personnel may be provided with directions that are more intuitive to follow because invariant features may be identified in the directions by type (e.g., "east of sprinkler," "south of cistern") rather than simply referring to positions in rows of crops.

FIG. 3 depicts two high-elevation images 360A, 360B captured of agricultural area 212. These two images 360A, 360B may have been captured, for instance, during a sweep of UAV $108_1$ over agricultural area 212. A number of the invariant anchor points depicted in FIG. 2 are also visible in these images 360A, 360B. For example, sprinkler 244, junction 246, piping 248, cistern 250, and empty spot 252 are all visible in first high-elevation image 360A. Sprinkler 244, junction 246, piping 248, cistern 250, empty spot 252, and farm equipment 256 are all visible in second high-elevation image 360B.

In various implementations, alignment module 124 may be configured to align high-elevation images 360A, 360B, which were previously annotated by inference module 118 into regions with variant features and regions with invariant anchor points. In various implementations, this alignment may be based on one or more of the invariant anchor points that are common among the high-elevation images. In FIG. 3, for instance, anchor points 246, 248, 250, and 252 are visible in both high-elevation images 360A, 360B. Thus, alignment module may utilize some or all of these common invariant anchor points 246, 248, 250, and 252 to align first high-elevation image 360A and second high-elevation image 360B. An example of these two images aligned using these common invariant anchor points 246, 248, 250, and 252 is depicted in FIG. 4.

Figure 4:
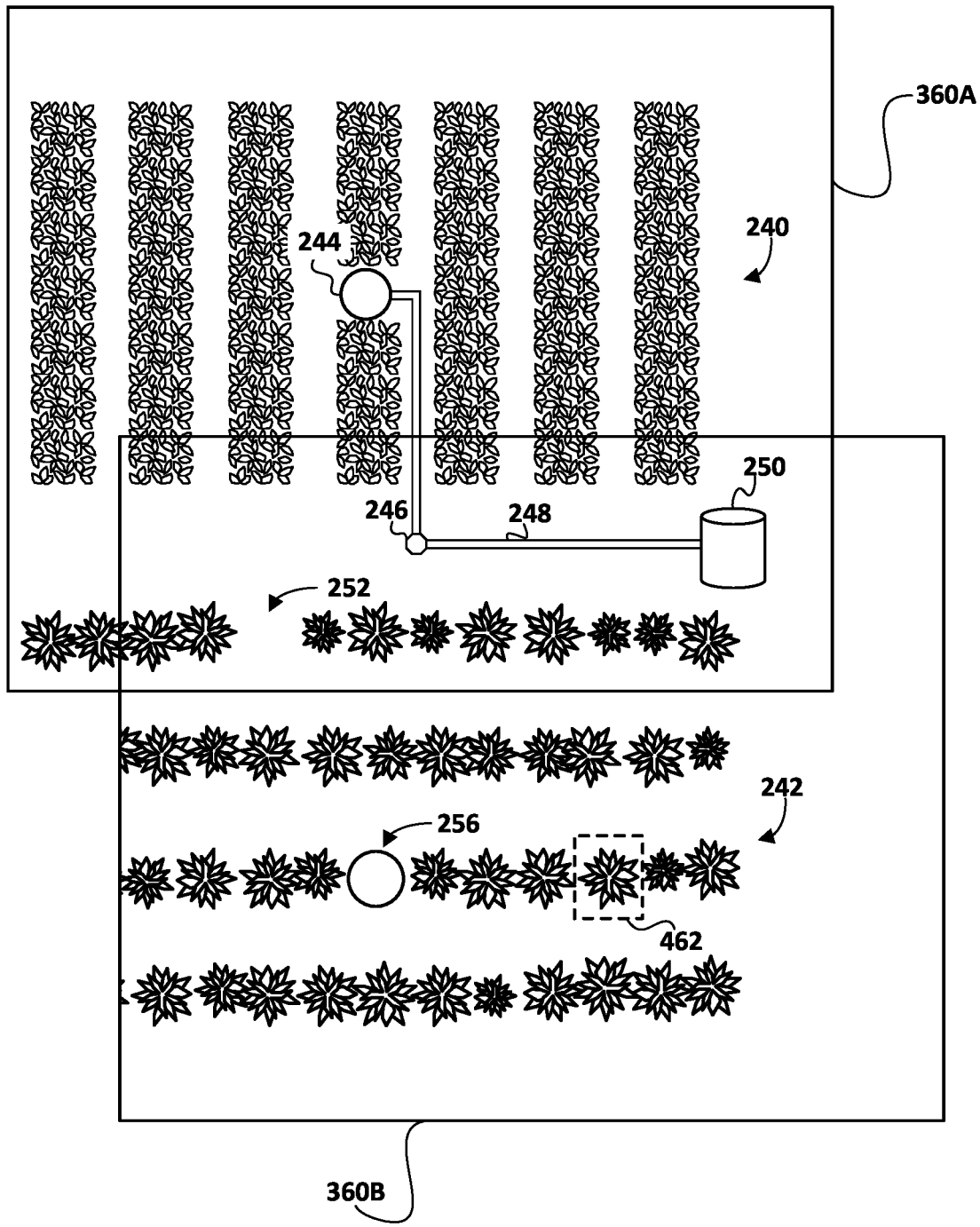

Once the images 360A, 360B are aligned as depicted in FIG. 4, localization module 126 may localize the invariant anchor points relative to each other. For example, sprinkler 244 may be assigned a relative position coordinate of "three plants north of junction 246, which is one row north and 2-3 plants east of empty spot 252." Similar relative position coordinates may be assigned, e.g., by localization module 126, to other invariant anchor points. With the invariant anchor points localized, individual plants can also be localized with either image 360A, 360B individually, e.g., without having to perform a full conventional stitching process (e.g., blending/fusing can be skipped). For example, one plant 462 in second plot 242 can be localized relative to invariant anchor points, such as "on the same row and four plants east of farm equipment 256," and/or "three rows south and two plants west of cistern 250."

In some implementations, individual plants and/or invariant anchor points may be localized using absolute position coordinates, in addition to or instead of relative position coordinates. For example, GPS coordinates of particular visual features, such as corners of plots 240, 242, may be known and/or ascertainable from a GPS coordinate of UAV $108_1$. If multiple GPS coordinates are ascertained for multiple invariant anchor points in a given high-elevation image, then it is possible to interpolate GPS coordinates for individual plants relative to those invariant anchor point GPS coordinates.

Figure 5:
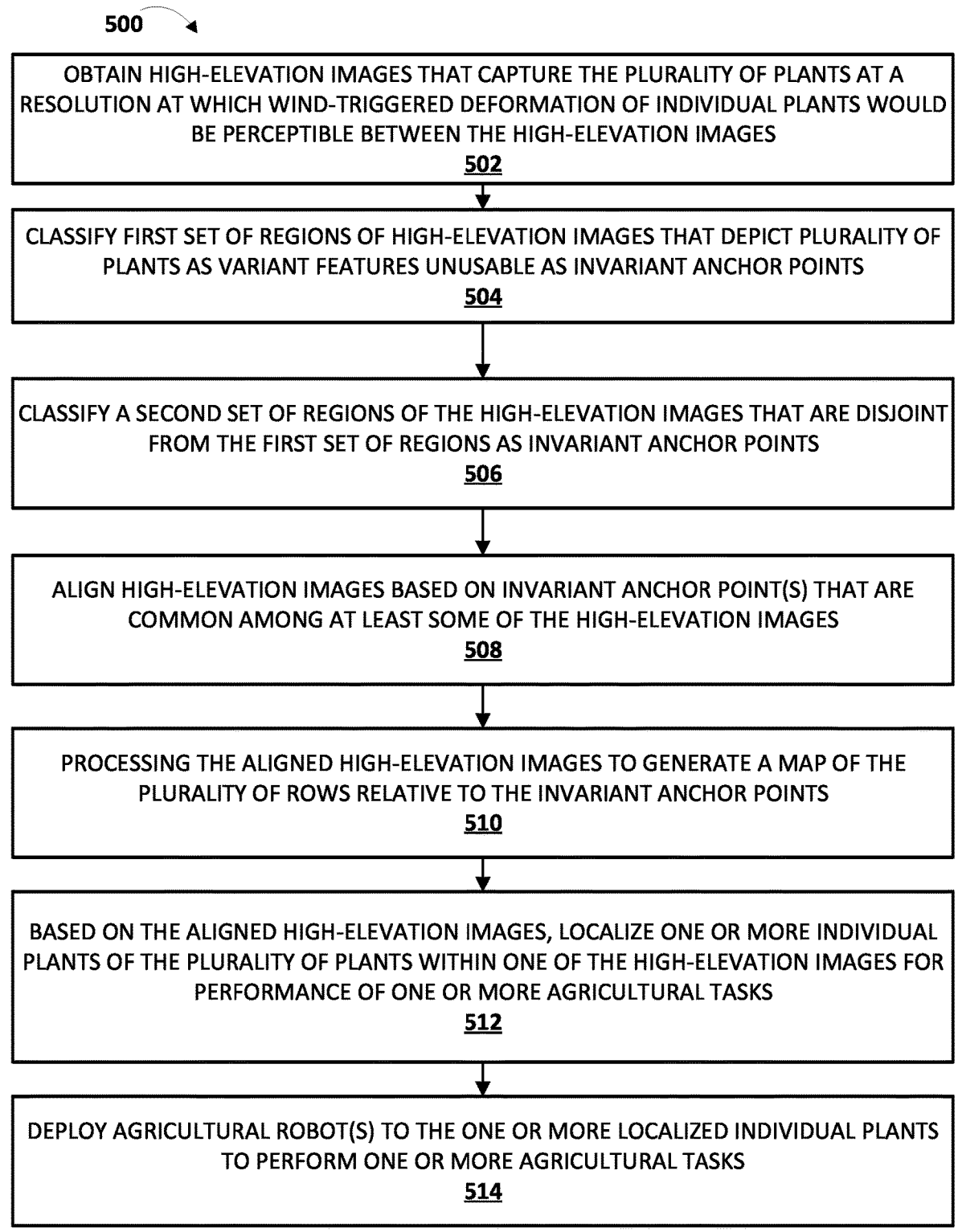
FIG. 5 is a flowchart of an example method in accordance with various implementations described herein.

FIG. 5 illustrates a flowchart of an example method 500 for localizing one or more individual plants of a plurality of plants. The operations of FIG. 5 can be performed by one or more processors, such as one or more processors of the various computing devices/systems described herein, such as by plant knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system may obtain high-elevation images (e.g., 360A, 360B) that capture a plurality of plants at a resolution at which wind-triggered deformation of individual plants is (e.g., would be) perceptible between the high-elevation images. For example, UAV $108_1$ may be flown over agricultural area 112 or 212 at an elevation such as between ten and one hundred or more meters and may capture high-elevation images (e.g., 360A, 360B) at some predetermined frequency, such as once every two seconds, once every three seconds, etc. In some implementations, these high-elevation images may be obtained for plant knowledge system 104 by vision data module 114.

At block 504, the system, e.g., by way of inference module 118, may classify a first set of regions of the high-elevation images that depict the plurality of plants as variant features that are unusable as invariant anchor points. For example, inference module 118 may use one or more CNNs trained to classify regions as depicting plants of particular types and/or plants in general (e.g., terrain classification) to process the high-elevation digital images obtained at block 502. These region classifications may take various forms, such as pixel-wise and/or bounding shape annotations.

At block 506, the system, e.g., by way of inference module 118, may classify (e.g., via pixel-wise or bounding shape annotation) a second set of regions of the high-elevation images that are disjoint from the first set of regions as invariant anchor points. As noted previously, these regions may simply be those that are excluded from the first set of regions that were classified as invariant features. Additionally or alternatively, inference module 118 may apply various object recognition techniques (e.g., using one or more trained CNNs) to classify, as invariant anchor points, objects that are known to be insufficiently deformable or otherwise sufficiently invariant. As noted previously, these invariant anchor points may include, for instance, farm equipment, man-made structures, natural features that are not purely transient, dead/lodged plants, etc. In some implementations, a CNN may be trained to classify an individual plant into one of multiple categories, such as "pre-harvest," "healthy," "harvest-ready," "infested," "overwatered,"

"dead," and/or "lodged," to name a few. In some such implementations, plants classified into the "dead" or "lodged" categories may be treated as invariant anchor points, whereas plants classified into the other categories may be treated as variant feature points.

At block 508, the system, e.g., by way of alignment module 124, may align the high-elevation images (e.g., 360A, 360B) based on one or more of the invariant anchor points that are common among at least some of the high-elevation images. An example of this was depicted in FIG. 4, wherein invariant anchor points 246-252 were used to align high-elevation images 360A and 360B.

In some implementations, at block 510, the system, e.g., by way of mapping module 128, may process the aligned high-elevation images to generate a map of a plurality of rows relative to the invariant anchor points. For example, object recognition processing may be applied to identify rows of plants in the digital images. These identified rows may be used by mapping module 128 to generate a map of an agricultural area that also includes invariant anchor points. The mapping of block 510 may be performed by the system at any point relative to the other operations of method 500.

Based on the aligned high-elevation images, and if applicable, the mapping at block 510, at block 512, the system, e.g., by way of localization module 126, may localize one or more individual plants of the plurality of plants within one of the high-elevation images for performance of one or more agricultural tasks. In some implementations, object recognition processing may be applied to assign individual plants relative position coordinates. For example, a number of rows between a target plant and an invariant anchor point may be counted, e.g., via object recognition or using a map generated at block 510, to assign the target plant a position such as "three rows south and two plants [or columns] west of cistern."

Unlike with conventional stitching-based localization techniques, with the alignment techniques described herein, it is not necessary to use a stitched and blended together composite image for localization. Rather, because individual invariant anchor points are localized relative to each other (and with GPS coordinates in some implementations), one or more individual (e.g., unstitched) high-elevation images can be used to localize an individual plant.

In some implementations, at block 514, the system, e.g., by way of farm task module 113, may deploy one or more agricultural robots to the one or more of the localized individual plants to perform one or more agricultural tasks. For example, in some implementations, in addition to localizing individual plants, other image processing techniques (e.g., trained machine learning models such as CNNs) may be applied to classify individual plants in the high-elevation images as being in need of some agricultural task. Weeds may be classified and targeted for remediation, e.g., via mechanical destruction (e.g., pulling) or via chemical application. Crops may be classified as ready for harvest or as being infested with pests. Based on these additional classifications, and based on the localizations determined using techniques described herein, agricultural robots (or agricultural personnel) may be deployed to perform various agricultural tasks.

Figure 6:
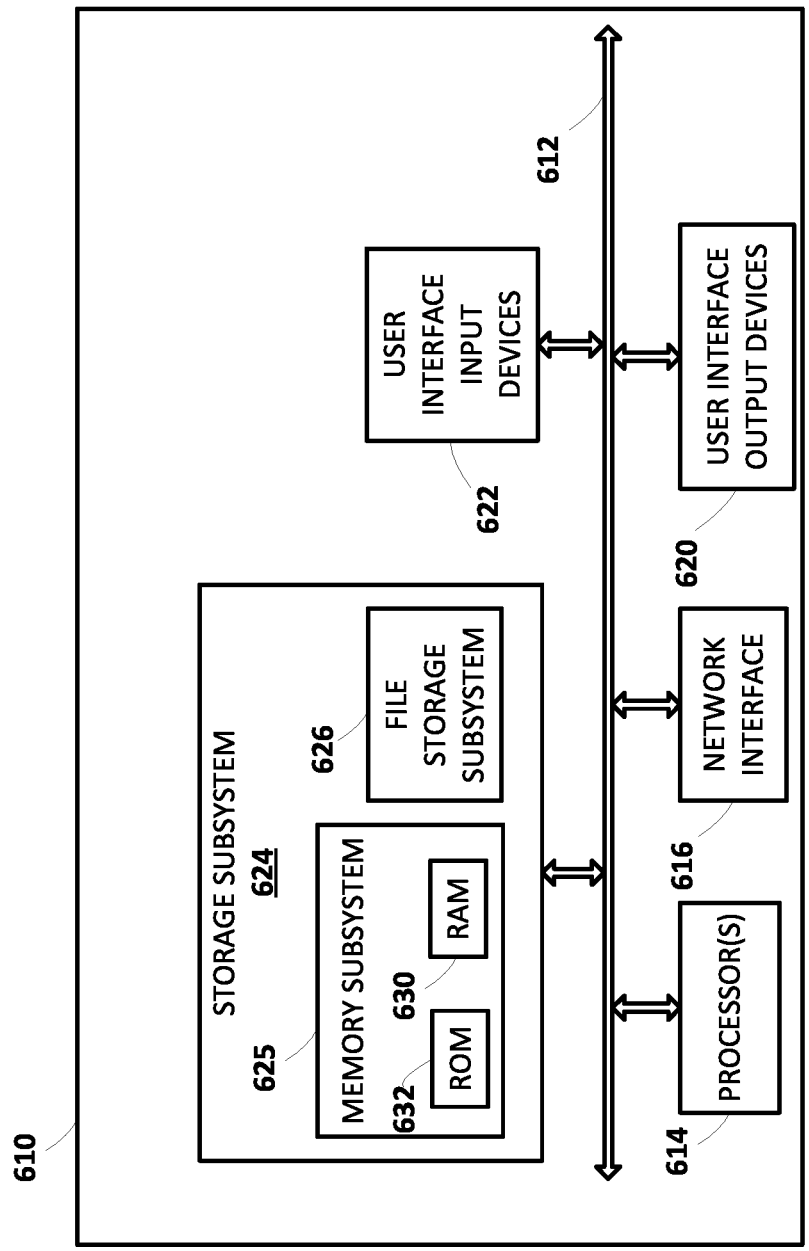
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for localizing one or more individual plants of a plurality of plants, the method implemented using one or more processors and comprising:
    obtaining high-elevation images that depict the plurality of plants at a resolution at which wind-triggered deformation of individual plants is perceptible between the high-elevation images;
    classifying a first set of regions of the high-elevation images that depict deformable plants as variant visual features that are unusable as invariant anchor points, wherein each region of the first set includes a respective cluster or bounded area of pixels that depict deformable plants;
    classifying a second set of regions of the high-elevation images that are disjoint from the first set of regions as invariant anchor points, wherein each region of the second set includes a respective cluster or bounded area of pixels;
    spatially aligning the high-elevation images based on one or more of the invariant anchor points that are common among at least some of the high-elevation images; and
    based on the spatially-aligned high-elevation images, localizing one or more individual plants of the plurality of plants within one of the high-elevation images for performance of one or more agricultural tasks.

2. The method of claim 1, wherein the localizing includes assigning position coordinates to the one or more individual plants based on position coordinates generated by an airborne vehicle that acquired the high-elevation images.

3. The method of claim 1, wherein the localizing includes mapping the one or more individual plants to one or more rows of a plurality of rows in which the plurality of plants are arranged.

4. The method of claim 3, further comprising processing the aligned high-elevation images to generate a map of the plurality of rows relative to the invariant anchor points.

5. The method of claim 1, wherein each region of the first and second sets of regions are pixel-wise classified.

6. The method of claim 1, further comprising deploying one or more agricultural robots to the one or more localized individual plants to perform one or more of the agricultural tasks.

7. The method of claim 1, wherein the high-elevation images are acquired by an unmanned aerial vehicle (UAV).

8. The method of claim 1, wherein classifying the first set of regions includes processing the high-elevation images based on one or more machine learning models that are trained to recognize one or more plant types.

9. The method of claim 1, wherein classifying the second set of regions includes detecting one or more lodged plants among the plurality of plants.

10. The method of claim 1, wherein classifying the second set of regions includes detecting agricultural equipment in spatial proximity with the plurality of plants.

11. The method of claim 1, wherein classifying the second set of regions includes detecting one or more water features or roads in spatial proximity with the plurality of plants.

12. A system for localizing one or more individual plants of a plurality of plants, the system comprising one or more processors memory storing instructions that cause the one or more processors to:
    obtain high-elevation images that depict the plurality of plants at a resolution at which wind-triggered deformation of individual plants is perceptible between the high-elevation images;
    classify a first set of regions of the high-elevation images that depict deformable plants as variant visual features that are unusable as invariant anchor points, wherein each region of the first set includes a respective cluster or bounded area of pixels that depict deformable plants;
    classify a second set of regions of the high-elevation images that are disjoint from the first set of regions as invariant anchor points, wherein each region of the second set includes a respective cluster or bounded area of pixels;
    spatially align the high-elevation images based on one or more of the invariant anchor points that are common among at least some of the high-elevation images; and
    based on the spatially-aligned high-elevation images, localize one or more individual plants of the plurality of plants within one of the high-elevation images for performance of one or more agricultural tasks.

13. The system of claim 12, further comprising instructions to assign position coordinates to the one or more individual plants based on position coordinates generated by an airborne vehicle that acquired the high-elevation images.

14. The system of claim 12, further comprising instructions to map the one or more individual plants to one or more rows of a plurality of rows in which the plurality of plants are arranged.

15. The system of claim 14, further comprising instructions to process the aligned high-elevation images to generate a map of the plurality of rows relative to the invariant anchor points.

16. The system of claim 12, wherein each region of the first and second sets of regions are pixel-wise classified.

17. The system of claim 12, further comprising instructions to deploy one or more agricultural robots to the one or more localized individual plants to perform one or more of the agricultural tasks.

18. The system of claim 12, wherein the high-elevation images are acquired by an unmanned aerial vehicle (UAV).

19. The system of claim 12, further comprising instructions to process the high-elevation images based on one or more machine learning models that are trained to recognize one or more plant types.

20. A non-transitory computer-readable medium for localizing one or more individual plants of a plurality of plants, the medium comprising instructions that, in response to execution of the instructions by a processor, cause the processor to:

obtain high-elevation images that depict the plurality of plants at a resolution at which wind-triggered deformation of individual plants is perceptible between the high-elevation images;

classify a first set of regions of the high-elevation images that depict deformable plants as variant visual features that are unusable as invariant anchor points, wherein each region of the first set includes a respective cluster or bounded area of pixels that depict deformable plants;

classify a second set of regions of the high-elevation images that are disjoint from the first set of regions as invariant anchor points, wherein each region of the second set includes a respective cluster or bounded area of pixels;

spatially align the high-elevation images based on one or more of the invariant anchor points that are common among at least some of the high-elevation images; and based on the spatially-aligned high-elevation images, localize one or more individual plants of the plurality of plants within one of the high-elevation images for performance of one or more agricultural tasks.

* * * * *